United States Patent [19]

Goetzer et al.

[11] Patent Number: 5,716,731
[45] Date of Patent: Feb. 10, 1998

[54] ELECTROCHEMICAL CELL

[75] Inventors: Johan Goetzer, Pretoria; Roger J. Wedlake; Gordon Brodie, both of Johannesburg, all of South Africa; Røger J. Bones, Abingdon, England

[73] Assignee: Electro Chemical Holdings Societe Anonyme, Luxembourg, Luxembourg

[21] Appl. No.: 804,315

[22] Filed: Feb. 21, 1997

[30] Foreign Application Priority Data

Feb. 27, 1996 [GB] United Kingdom ............... 9604133

[51] Int. Cl.$^6$ .................................................. H01M 10/39
[52] U.S. Cl. ........................................ 429/103; 429/104
[58] Field of Search ...................... 429/104, 103, 429/102, 193, 112

[56] References Cited

U.S. PATENT DOCUMENTS

| | | | |
|---|---|---|---|
| 1,368,093 | 2/1921 | Allen . | |
| 3,932,195 | 1/1976 | Evans et al. | 236/6 |
| 4,038,462 | 7/1977 | Rohr | 429/30 |
| 4,102,042 | 7/1978 | Weiner | 29/623.2 |
| 4,279,974 | 7/1981 | Nishio | 429/104 |
| 4,401,731 | 8/1983 | Steinleitner | 429/104 |
| 4,405,696 | 9/1983 | Fischer et al. | 429/104 |
| 4,424,262 | 1/1984 | von Alpen et al. | 429/8 |
| 4,473,624 | 9/1984 | Hug et al. | 429/104 |
| 4,564,568 | 1/1986 | Hasenauer et al. | 429/104 |
| 4,722,875 | 2/1988 | Wright | 429/103 |
| 4,774,156 | 9/1988 | Bones et al. | 429/103 |
| 4,913,754 | 4/1990 | Duncan et al. | 156/85 |
| 4,956,246 | 9/1990 | Kamuf et al. | 429/104 |
| 5,230,968 | 7/1993 | Bones et al. | 429/191 |
| 5,279,908 | 1/1994 | Bones et al. | 429/102 |
| 5,563,006 | 10/1996 | Von Benda et al. | 429/104 |

FOREIGN PATENT DOCUMENTS

| | | |
|---|---|---|
| 856697 | 11/1970 | Canada . |
| 1054674 | 5/1979 | Canada . |
| 2277444 | 1/1976 | France . |
| 2315778 | 1/1977 | France . |
| 2018013 | 10/1979 | United Kingdom . |
| 2226692 | 7/1990 | United Kingdom . |
| WO 89/04068 | 5/1989 | WIPO . |

OTHER PUBLICATIONS

Knoedler and Krapf, "Design and Performance of a Sodium/Sulphur Multitude Cell," *Journal of Power Sources*, 10:263–270, 1983, No month.

Johnson, Patent Specification Republic of South Africa 87/6885 "Battery," Sep. 14, 1987.

Patent Specification UK 1,421,702 "Electrochemical Cells," Jan. 21, 1976.

Patent Specification UK 1,461,071 "Improvements in or Relating to Electrochemical Cells Having a Liquid Alkali Metal Electrode," Jan. 13, 1977.

Patent Specification UK 1,508,803 "Improvements in or Relating to Electric Batteries," Apr. 26, 1978.

Patent Specification UK 1,505,987 "Improvements in or Relating to Electric Cells," Apr. 5, 1978.

*Primary Examiner*—Anthony Skapars
*Attorney, Agent, or Firm*—Arnold, White & Durkee

[57] ABSTRACT

A high temperature rechargeable electrochemical cell is provided, comprising a housing divided by a pair of concentric separator tubes into two anode compartments each containing molten alkali metal active anode material, the alkali metal in each anode compartment being electronically connected to the alkali metal in the other anode compartment, and a cathode compartment sandwiched between the anode compartments. The cathode compartment contains cathode material comprising a porous electrolyte-permeable electronically conductive matrix with a charged state in which it has a transition metal halide active cathode material dispersed therein, the matrix being impregnated with molten salt electrolyte. The cell comprises a cathode current collector tube located between the separator tubes, so that an inner part of the cathode is located between the smaller separator tube and the current collector tube, an outer part of the cathode being located between the current collector tube and the larger separator tube.

11 Claims, 5 Drawing Sheets

ELECTROCHEMICAL CELL

THIS INVENTION relates to a high temperature rechargeable electrochemical cell. More particularly it relates to such electrochemical cell which has an anode comprising molten alkali metal active anode material and a cathode which has a charged state in which it comprises a solid transition metal halide active cathode material dispersed in a porous interior of an electronically conductive electrolyte-permeable matrix impregnated with a molten alkali metal aluminium halide molten salt electrolyte, the active anode material and active cathode material being radially separated from each other and electrochemically coupled with each other by means of a tubular solid electrolyte separator tube.

According to the invention there is provided a rechargeable electrochemical cell comprising a cell housing divided by a pair of solid electrolyte separator tubes into two anode compartments each containing alkali metal active anode material, the alkali metal in each anode compartment being electronically connected to the alkali metal in the other anode compartment, and a cathode compartment sandwiched between the anode compartments, the cathode compartment containing cathode material comprising a porous electrolyte-permeable electronically conductive matrix and having a charged state in which it has a transition metal halide active cathode material dispersed in finely divided and/or thin-layer solid form in the porous interior thereof, the matrix being impregnated with a molten salt electrolyte, the molten salt electrolyte being an alkali metal aluminium halide molten salt electrolyte having an aluminium:alkali metal atomic ratio of at most 1:1, the cell having an operating temperature at which both the alkali metal active anode material and the alkali metal aluminium halide molten salt electrolyte are molten, the housing and each separator tube being hollow and tubular in shape and being arranged so that the housing is outermost, a larger of the separator tubes nests within the housing and a smaller of the separator tubes nests within said larger separator tube, an inner of said anode compartments being defined by the interior of the smaller separator tube, the cathode compartment being defined between the separator tubes and an outer of said anode compartments being defined between the larger separator tube and the housing, the cell having an anode comprising the active anode material contained in both anode compartments and the cell having a cathode comprising the cathode material contained in the cathode compartment, the cell further comprising a cathode current collector which is a tube and nests within the larger separator tube with the smaller separator tube nesting within the cathode current collector tube, so that an inner part of the cathode is located between the smaller separator tube and the current collector tube and so that an outer part of the cathode is located between the cathode current collector tube and the larger separator tube.

Preferably, the molten salt electrolyte is in all states of charge of the cell in contact with solid alkali metal halide dispersed in the cathode matrix.

The shape and size of the cathode current collector tube, and its location between the separator tubes, may be selected so that the active cathode material in the inner part of the cathode is electrochemically coupled substantially only with the alkali metal anode material contained in the smaller separator tube, the active cathode material in the outer part of the cathode being electrochemically coupled substantially only with alkali metal anode material located between the larger separator tube and the housing.

The separator tubes and the current cathode collector tube may all be of substantially the same length, being all circular in cross-section and are located concentrically within the housing. Thus, the cathode current collector tube may occupy at least 90% of the length of the interior of the larger separator tube, while the smaller separator tube in turn may occupy at least 90% of the length of the interior of the larger separator tube.

The cathode current collector tube may have a tubular wall which is substantially impermeable to active cathode material. Substantially impermeable to active cathode material in this regard means that, while the current collector may have pinholes therethrough, or indeed may be perforated or in the form of an extremely fine mesh screen or gauze, so that it is not hermetically fluid-tight, and so that alkali metal ions can indeed diffuse therethrough, the size of pinholes, perforations or mesh openings therethrough is small enough effectively to prevent any physical movement of solid active cathode material through the barrier constituted by the cathode current collector tube. Conveniently, however, the wall of the cathode current collector tube is continuous and hermetically impermeable to diffusion therethrough by alkali metal ions of the molten salt electrolyte. When the cathode current collector tube is hermetically impermeable, it can be open at one end or both ends thereof, and when it is of perforated- or screen- or gauze construction, it can be closed at one end thereof, being its end remote from the open ends of the separator tubes, in the same fashion as the separator tubes, so that it may have the same shape as the separator tubes.

More particularly the alkali metal anode material contained in the interior of the smaller separator tube and the inner part of the cathode may together form a smaller sub-cell, the alkali metal anode material located between the larger separator tube and the housing and the outer part of the cathode together forming a larger sub-cell, the sub-cells being electronically connected in parallel with each other and having respective internal resistances which are in a ratio which remains substantially constant over all states of charge of the cell, from the fully charged state of the cell to the fully discharged state of the cell. Conveniently, the inner part of the cathode and the outer part of the cathode have respective capacities, and the smaller separator tube and the larger separator tube have respective surface areas, such that the inner cathode part capacity:outer cathode part capacity ratio is substantially the same as the smaller separator tube area:larger separator tube area ratio.

The separator tubes may each have an open end and a closed end, the open ends of the separator tubes being respectively glass welded to an electronically insulating ceramic closure whereby the cathode compartment is hermetically sealed. In a particular embodiment, the housing may be of metal, having an end adjacent the open ends of the separator tubes which is closed off by a metal closure which is welded in place, the housing acting as an anode current collector for the alkali metal anode material in the outer anode compartment, the inner anode compartment having an anode current collector projecting into alkali metal anode material in the inner anode compartment via the open end of the smaller separator tube from the metal closure, via which it is electronically connected to the housing, the cathode current collector tube having an extension projecting out of the ceramic and metal closures, from which closure it is electronically insulated.

Instead, a further possibility is that the open ends of the separator tubes may separately be glass welded to separate individual electronically insulating ceramic rings, one for each separator tube, the ceramic rings being connected together by a metal closure which hermetically seals the cathode compartment, the ceramic ring glass welded to the larger separator tube being connected to the housing by a metal closure which hermetically seals the other anode compartment, the smaller separator tube being closed off by a metal closure which hermetically seals the inner anode compartment, and said metal closures being connected to the ceramic rings by thermocompression bonding.

In each case, whether the cathode compartment is sealed by a ceramic closure or by a metal closure, as described above, the anode compartments, may be in communication with each other so that they are at the same pressure.

In a particular construction of the cell, the alkali metal active anode material may be sodium, the alkali metal aluminium halide molten salt electrolyte being a sodium aluminium chloride molten sal electrolyte, the active cathode material being nickel chloride, and the separators being of a material selected from β-alumina and β"-alumina. Any said electronically insulating ceramic material used for said ceramic cathode compartment closure, or welded as electronically insulating rings to the open ends of the separator tubes, is conveniently α-alumina, and the metal parts of the cell may, when the active cathode material is nickel halide in its charged state and nickel in its discharged state, be made of a metal selected from nickel, nickel alloys and mild steel.

The separator tubes may be separate from each other so that they are not integral or fused with each other and do not form a monolithic unit, being connected together only by a ceramic cathode compartment closure or by a ceramic/metal cathode compartment closure, at their open ends. While, in principle, the separator tubes can touch each other, e.g. at closed ends thereof, they will typically be spaced from each other by cathode material, being connected together, e.g. by an annular cathode compartment closure, at their open ends. The tubes and housing will typically be tubular and elongated hollow-cylindrical in shape, being circular in cross-section, but the housing, in particular, may be non-circular, having a polygonal cross-section to facilitate close packing of cells alongside one another, e.g. in a hexagonal or rectangular close-packing arrangement.

As the anode is contained in both anode compartments, each anode compartment will contain part of the anode, the anode parts respectively being an inner anode part and an outer anode part which are electronically connected together; and the cathode will be a common cathode respectively electrochemically coupled both with the inner anode part via the smaller separator tube and with the outer anode part via the larger separator tube.

As indicated above, it is a particular feature of the present invention that, while the total capacity of the anode parts taken together should match or be in harmony with the total capacity of the cathode in the usual way, the capacity of the outer anode part should be somewhat greater than the capacity of the inner anode part, the outer anode part:inner anode part capacity ratio being at least roughly equal to the larger separator tube:smaller separator tube area ratio. This feature has the consequence that, during discharging of cells having solid cathode material and which are of the alkali metal/transition metal halide type, electrochemical activity will start at opposite surfaces of the cathode, respectively adjacent the separator tubes, and will progress into the interior of the cathode, taking place finally in the interior of the cathode at a position (plane) spaced between the separator tubes and spaced between the surfaces of the cathode which respectively face the separator tubes, while, similarly, charging starts adjacent said separator tubes and progresses towards the position of said plane. The cathode current collector conveniently is located so that it coincides in substance with this plane, i.e. the plane will substantially be located in the wall of the cathode current collector. Rapid discharge at high power is thus promoted, and polarization such as concentration polarization in the cathode is resisted. More particularly, the various parameters which govern charging and discharging should be selected for the inner anode part and the outer anode part so that the inner and outer anode parts become fully charged and fully discharged, in normal use with charge/discharge cycling, at at least roughly the same time, preferably essentially simultaneously. It is expected that routine experiments and trial-and-error techniques can be employed to match the capacities of the anode parts with each other and with the capacity of the cathode, bearing in mind the volumes of the electrode compartments, the resistances of the separator tubes and the resistance of the cathode matrix.

A further, related, feature of the present invention is that, bearing in mind practical considerations, the cathode thickness, i.e. the spacing between the separator tubes, may be restricted, preferably to the range 5–15 mm, more preferably to the range 8–12 mm, e.g. 10 mm. Cathode thicknesses of this magnitude are a compromise between thin dimensions which promote higher power and thick dimensions which promote easy cell manufacture and/or loading using standard-type sintered sodium β- or β"-alumina tubes which are closed and more or less hemispherical at one end and open at the other.

As indicated above, the open ends of the separator tubes are conveniently connected together by an annular metal or ceramic cathode compartment closure which forms a bridging piece, bridging the annular gap between the separator tubes at their open ends. This closure maintains a gap between the separator tubes at their open ends, useful for filling the cathode compartment with granular or particulate cathode material or cathode precursor material, and with molten salt electrolyte melt. For this purpose the cathode compartment closure can be provided with a cathode filler pipe or cathode filler opening so that the cathode compartment closure can be welded in place before filling. After filling, the filler opening or tube can be closed off, e.g. by crimping it shut or by welding a metal or ceramic plug into it.

The total mass of the cathode current collector tube is a compromise, being kept low in order to promote low cell mass, while being kept high enough so that its electronic resistance is sufficiently low for adequate cell discharge power.

The invention will now be described, by way of example, with reference to the accompanying diagrammatic drawings, in which.

Figure 1:
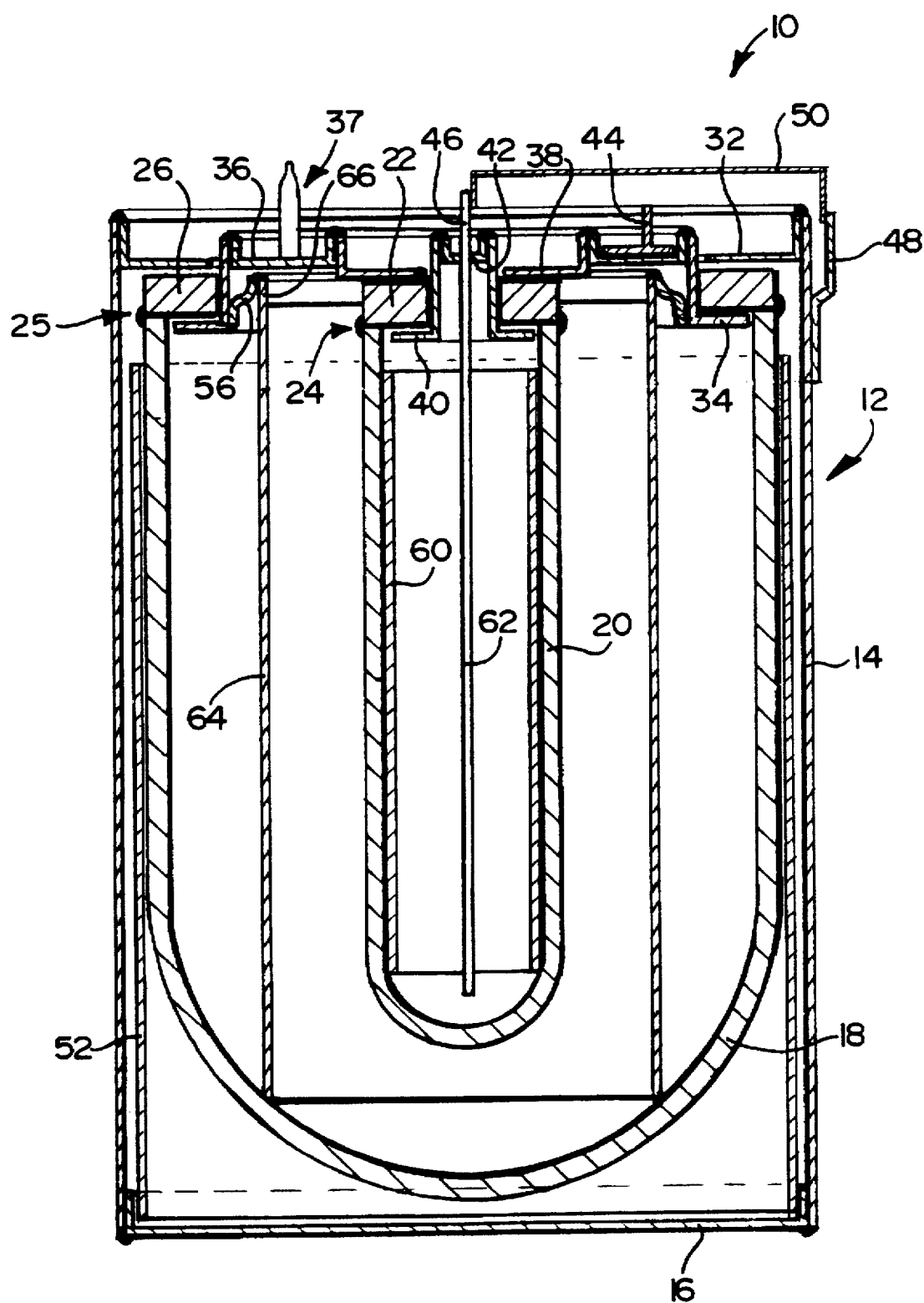
FIG. 1 shows a schematic sectional side elevation of a cell according to the present invention.

In FIG. 1 of the drawings, reference numeral 10 generally designates a high temperature rechargeable electrochemical cell in accordance with the present invention and having a sodium anode (not shown) and a cathode comprising a transition metal (nickel) chloride (charged)/transition metal (discharged) active cathode material dispersed in solid form in the porous interior of an electrolyte-permeable electronically conductive porous (nickel) matrix (also not shown) which is saturated with a molten salt electrolyte impregnated therein which is sodium aluminium chloride formed from a mixture of sodium chloride and aluminium chloride in which the Al:Na atomic ratio is at most 1:1. The transition metal is nickel and some solid sodium chloride is present in dispersed form in the matrix, in contact with the molten salt electrolyte.

The cell 10 has a mild steel housing 12 comprising a canister with a cylindrical side wall 14 having a circular floor 16 welded thereto. Concentrically located within the housing 12 are a larger sodium β"-alumina separator tube 18 and a smaller sodium β"-alumina separator tube 20, the tube 20 nesting in the tube 18, and the tube 18 nesting in the canister 12. The open end of the tube 20 is welded to an α-alumina insulating collar or ring 22 by a glass weld at 24 of a glass selected to be resistant to corrosion by molten sodium aluminium chloride molten salt electrolyte. The open end of the tube 18 is similarly glass welded at 25 to an α-alumina insulating collar or ring 26, by a glass selected to be resistant to corrosion by molten sodium.

The insulating ring 22 has a flat axially inwardly facing surface, to which the rim of the associated separator tube 20 is glass welded, the ring 26 having a similar axially inwardly facing surface, to which the rim of the associated tube 18 is glass welded. Each ring 22, 26 also has a flat axially outwardly facing surface. In a variation of this construction (see FIG. 4), the flat axially inwardly faces of the rings 22 and 26 may each be provided, at the outer periphery thereof, with a rebate (see FIG. 4) in which the rims of the tubes 20, 18 are respectively glass welded.

The ring 26 has a pair of nickel connecting rings respectively thermocompression-bonded to its axially inwardly and axially outwardly facing flat surfaces, namely an axially outer ring 32 having a flange bonded to the outwardly facing flat surface of the ring 26 and an upstanding rim welded to the upper end or open rim of the side wall 14 of the canister 12, and an axially inner ring 34 having a flange bonded to the axially inwardly facing flat surface of the ring 26 and an upstanding rim welded to an annular nickel connecting ring 36, which ring 36 connects the tubes 18, 20 to each other and which acts as a cathode closure ring. The ring 36 is provided with two upstanding rims, to a radially outer one of which the rim of the ring 34 is welded, and the ring 36 is provided with a filler tube 37, shown with its free or upper end crimped shut.

In turn the insulating ring 22 has a pair of nickel connecting rings respectively thermocompression-bonded to its axially inwardly and outwardly facing flat surfaces, namely an axially outer ring 38 having a flange bonded to the axially outwardly facing flat surface of the ring 22 and an upstanding rim welded to the radially inner one of the upstanding rims of closure ring 36, and an inner ring 40 having a flange bonded to the axially inwardly facing flat surface of the ring 22 and an upstanding rim welded to an upstanding peripheral rim on a central nickel anode closure cap or disc 42.

As mentioned above, the cathode closure ring 36 has, along its radially outer and inner edges, a pair of upstanding rims via which it is welded respectively to the upstanding rim of the ring 34 and the upstanding rim of the ring 38; and the closure disc 42 has an upstanding rim via which it is welded to the upstanding rim of the ring 40.

A metal cathode terminal designated 44 is spot welded to the axially outer surface of the closure ring 36. Two metal anode terminals are provided, respectively a terminal 46 spot welded to the axially outer surface of the closure disc 42 and a terminal 48 spot welded to the radially outer surface of the canister side wall 14 adjacent its open upper end. The terminals 46 and 48 are electronically connected by a metal connecting strip 50.

Figure 4:
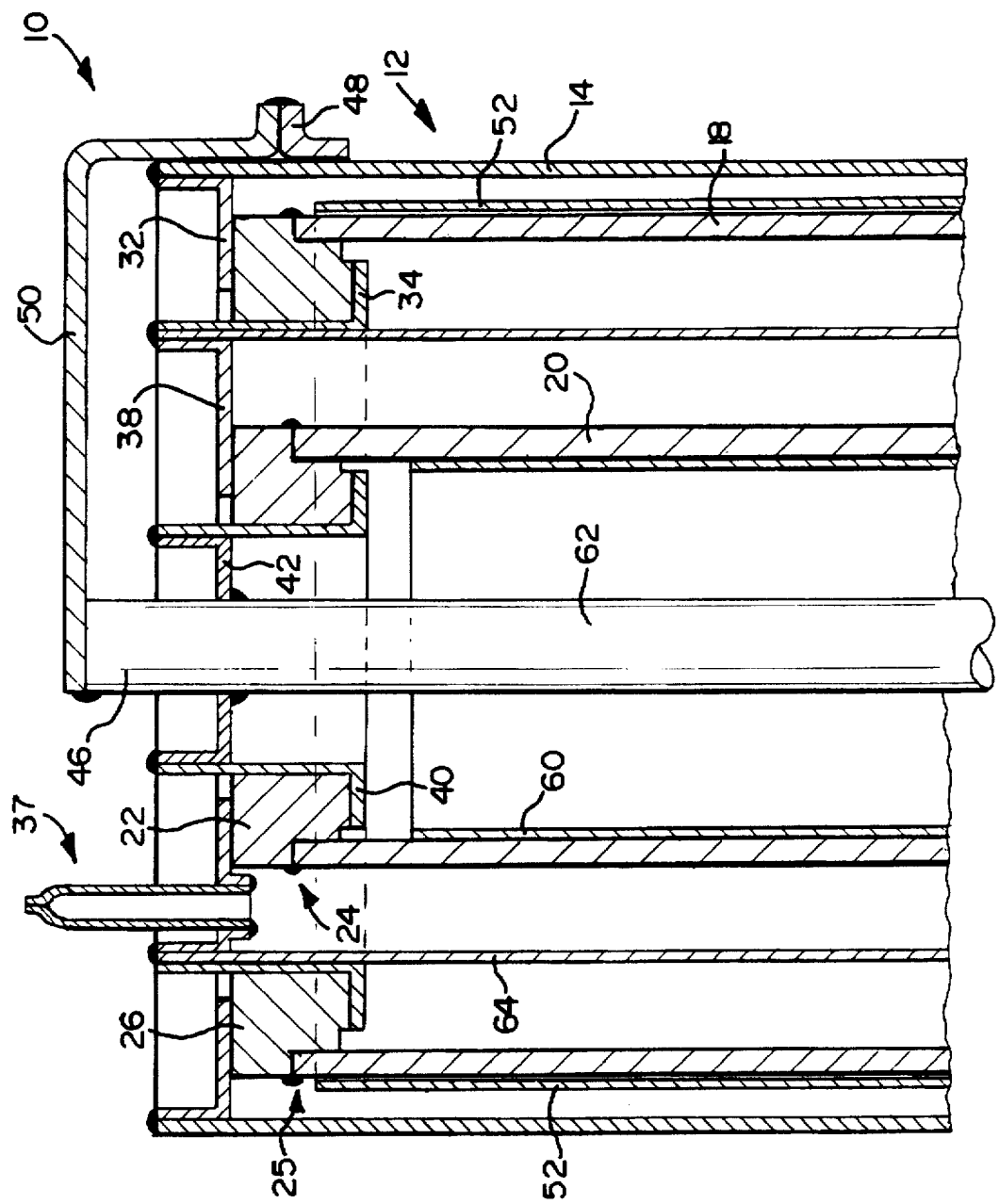
FIG. 4 shows, on an enlarged scale, a schematic detail in sectional side elevation of a variation of the cell of FIG. 1.

A thin-walled mild steel shim 52 which is of cylindrical shape is tightly wrapped around the radially outer surface of the larger tube 18 for wicking molten sodium over this outer surface. An inner anode current collector is provided in the tube 20 in the form of a steel current collector rod 62 having an upper end welded to the axially inner face of the closure disc 42. Instead, the terminal 46 and rod 62 can be integral with each other, being in the form of a post welded in a central opening in the disc 42 (as best shown in FIG. 4). A thin-walled mild steel shim 60 which is of a cylindrical shape similarly lines the inner surface of the tube 20 being resiliently stressed to bear radially outwardly against the inner surface of tube 20.

It will be appreciated that the disc 42 closes off the anode compartment in the tube 20 and the ring 36 closes off the cathode compartment between the tubes 18 and 20, while the flange of the ring 32 projects radially outwardly from the insulating ring 26 to close off the anode compartment defined between the tube 18 and the wall 14 of the canister 12.

A cylindrical tube 64, open at both ends, and having a wall of continuous nickel construction, impervious to passage therethrough of sodium ions or any other constituents of the cathode, forms a cathode current collector.

The tube 64 has, at its upper end, a pair of diametrically opposed upward extensions 66 from its upper rim, connected respectively to a pair of nickel conducting lugs 56 fixed at diametrically spaced positions to the radially inner face of the upstanding rim of the ring 34. Naturally, instead of having two such extensions 66, it can have three, equally circumferentially spaced in series from one another, for connection to three similarly spaced lugs of the type shown at 56 (see FIG. 3).

The tube 64 is of a diameter such that it occupies the plane in the cathode which separates the part of the cathode coupled by the tube 20 with the anode part in the tube 20, from the part of the cathode coupled by the tube 18 with the part of the anode outside the tube 18, between the tube 18 and housing 12, i.e. the plane where electrochemical activity in the cathode ends during discharging and starts during charging. While the current collector 64 shown is a continuous sheet of nickel, naturally, it can be perforated or can be of nickel mesh or gauze, in which case its lower end need not be open, but can be closed or domed in the fashion of the separator tubes 18 and 20.

It is a particular feature and advantage of the cell of FIG. 1 that the diameters of the tubes 18 and 20 can be selected to provide a cell of high power when compared with cells of similar cylindrical construction but having a single separator separating a single anode from the cathode, of the same total capacity and energy density. This increase in power arises from increased (substantially doubled) separator area in a cell housing of the same size compared with single-separator cells. Seen differently, cells can be made according to the invention which are double the size and capacity of single-separator cells, but which can be discharged and charged in the same time as single-separator cells half their size. Larger cells of increased capacity thus become feasible, and batteries can be made of fewer components while achieving the same overall capacity, leading to a drop in costs.

To make the cell the sodium β"-alumina tubes 18, 20 are pressed and sintered in the usual way, and are glass welded to the α-alumina rings 26 and 22 respectively, the welding taking place after the rings 32 and 34 have been thermocompression-bonded to the ring 26 and after the rings 38 and 40 have been thermocompression-bonded to the ring 22. The shim 52 is rolled from a flat sheet into a cylindrical shape with a diameter less than that of the outer surface of the tube 18 and the tube 18 is inserted axially into the shim 52 so that the shim 52 is stressed and bears radially inwardly against and resiliently grips the tube. Similarly the shim 60 is rolled from a flat plate to have a diameter slightly larger than the inner diameter of the tube 20 and is inserted axially into the tube 20 so that the shim 60 is resiliently stressed and bears radially outwardly against the tube 20.

The upstanding rim of the ring 32 is welded to the open upper end of the wall 14 of the housing 12 and the lower end of said wall 14 is welded to the floor 16. The flange of the ring 32 extends over and closes off the upper end of the housing 12, above the gap between the shim 52 and wall 14. Naturally, if desired, the shim 52 can be placed around the tube 18 after the ring 32 is welded to the wall 14 and before the canister 12 is closed by the floor 16; and, if desired, a deep drawn tube may be used to provide the wall 14 and floor 16 integrally without welding separate parts together. In turn, the cap 42 is welded to the current collector rod 62, and the rod 62 is inserted into the tube 20, before the upstanding rim of the cap 42 is welded to that of the ring 40.

The nickel tube 64 is inserted concentrically into the tube 18 and are welded to the lugs 56, and the tube 20 is then inserted into the tube 64, in a position concentric with the tube 18. Granular cathode precursor material is than loaded into the space between the tubes 18, 20 via the open upper end of the tube 18, and is tapped/tamped until tap dense and to eliminate voids, followed by molten liquid electrolyte. The closure ring 36 is then welded via its upstanding rims to those of the rings 34, 38. The terminals 44, 46, 48 will than be welded in place if this has not been done earlier, and the strip 50 will then be welded to the terminals 46 and 48.

Instead, and possibly more conveniently, the filler tube 37 can be employed. In this case the ring 36 is welded in place before loading, granular cathode precursor material and molten salt electrolyte being loaded via the tube 37, followed by crimping shut of the upper end of the tube 37. In this case, instead of touching the inner surface of the tube 18 as shown in FIG. 1, the tube 64 can be spaced axially somewhat from the inner surface of the tube 18 to facilitate loading of the tube 18 with said particulate cathode precursor material and molten salt electrolyte.

The cell can then be commissioned by subjecting it to a charging potential to generate sodium in the anode compartments and nickel chloride active cathode material in the cathode compartment in known fashion (see U.S. Pat. Nos. 4,529,676 and 4,797,333 and British Patent 2 226 692), followed optionally by several discharge/charge cycles to condition the cell, naturally at an elevated operating temperature at which sodium and the molten salt electrolyte are molten.

Figure 2:
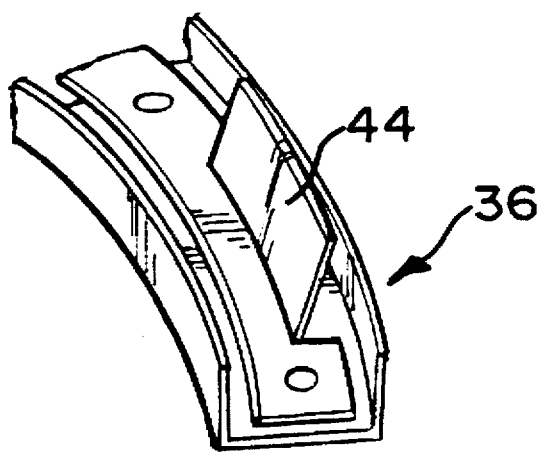
FIG. 2 shows a schematic three dimensional view, on an enlarged scale, of the cathode terminal of the cell of FIG. 1.

In FIG. 2 the same reference numerals are used as in FIG. 1, part of the closure ring 36 being shown in more detail, together with the cathode terminal 44.

Figure 3:
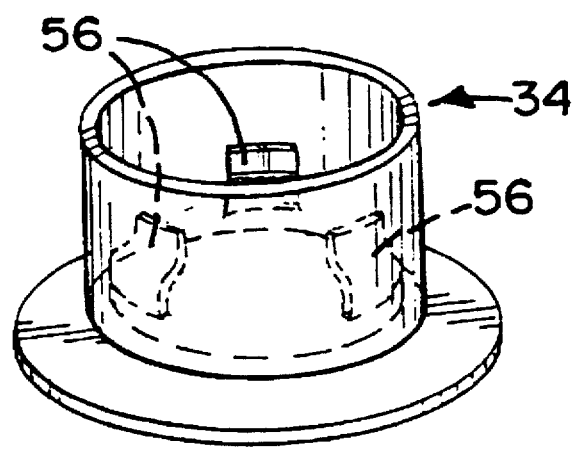
FIG. 3 shows a schematic three dimensional view of a variation of one of the connecting rings of FIG. 1.

In FIG. 3 the ring 34 intended for use with the current collector 64 of FIG. 1 is shown, the three conducting lugs 56 being illustrated, instead of the two shown in FIG. 1.

FIG. 4 shows a variation of the construction shown in FIG. 1. Only the upper part of the cell of FIG. 4 is shown, the lower part being of the same construction as that of FIG. 1. In FIG. 4 the same reference numerals designate the same parts as in FIG. 1, unless otherwise specified. The principal differences between the constructions of FIGS. 1 and 4 relate to the omission of the closure ring 36 of FIG. 1 from FIG. 4, and the way in which the cathode current collector tube 64 is fixed in position.

Thus, instead of using the ring 36 to connect together the connecting rings 34 and 38, FIG. 4 uses the current collector tube 64 to connect the rings 34 and 38 together, the tube 64 being welded with its upper end or rim in a position sandwiched between the upstanding rims of the rings 34 and 38. In FIG. 4, the filler tube 37 is provided in the flange of the ring 38, where this flange overhangs the cathode compartment, and the cathode terminal 44 is omitted, the tube 37 acting as the cathode terminal. Furthermore, in FIG. 4, the radial insulating space between the flange of the ring 32 and the rim of the ring 34, and the radial insulating space between the flange of the ring 38 and the rim of the ring 40, are more clearly visible than in FIG. 1.

Turning to FIG. 5, once again a variation of the construction of FIG. 1 is shown, the lower part of the cell being of the same construction as that of FIG. 1 and the same reference numerals referring to the same parts unless otherwise specified.

Figure 5:
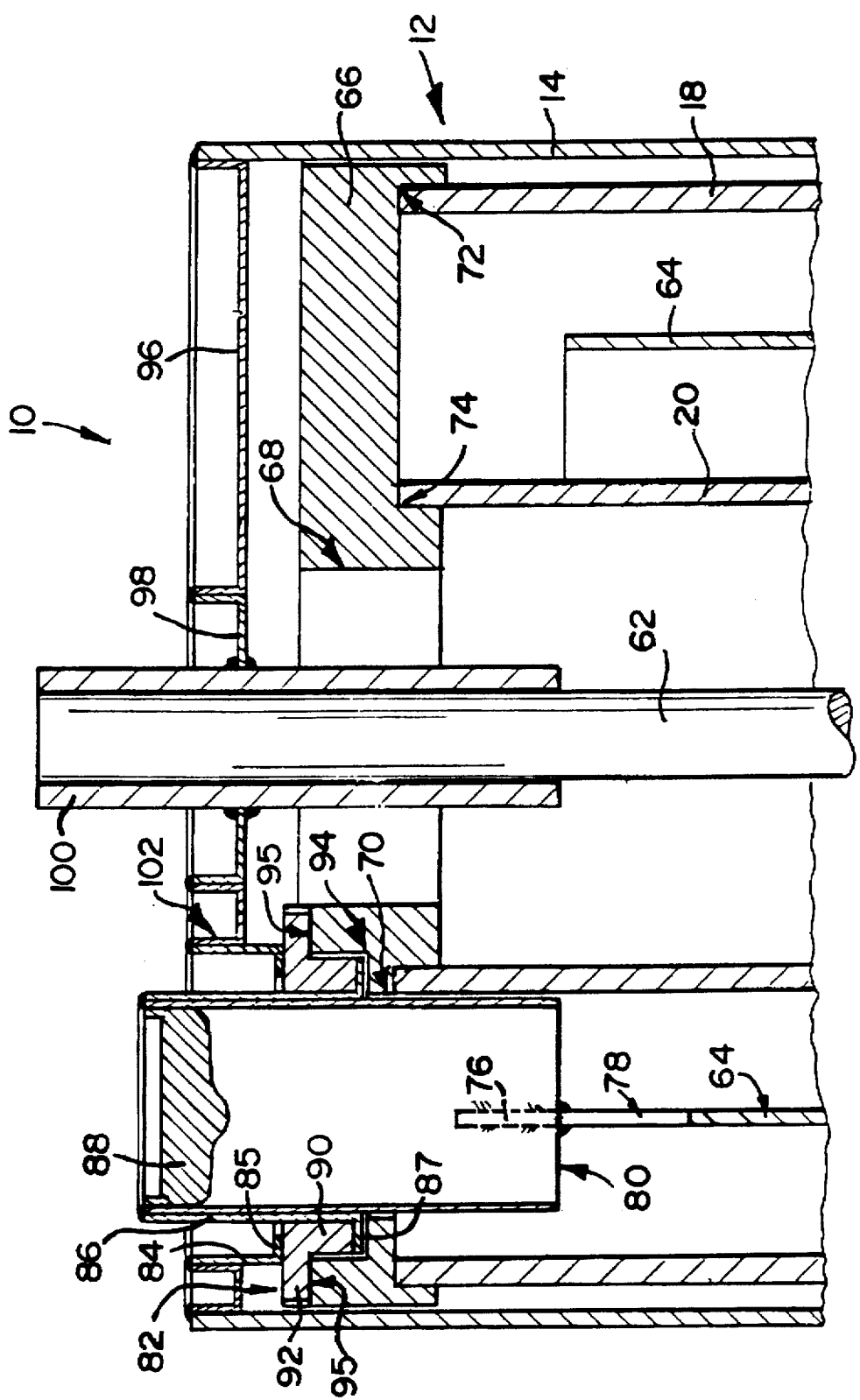
FIG. 5 shows, similarly to FIG. 2, a detail of a further variation of the cell of FIG. 1.
Figure 6:
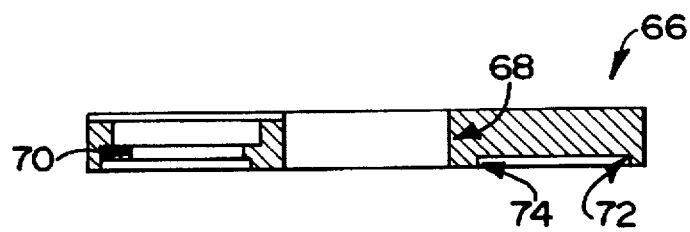
FIG. 6 shows a sectional side elevation of a cathode compartment closure for the cell of FIG. 5.
Figure 7:
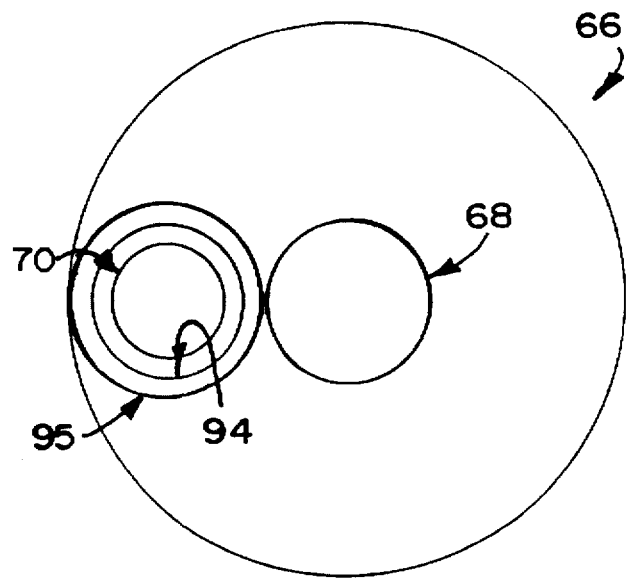
FIG. 7 shows a plan view of the closure of FIG. 6.

The principal difference between the construction of FIG. 5, on the one hand, and those of FIGS. 1 and 4, on the other hand, is that the α-alumina ceramic rings 22 and 26 and the various metal connecting rings (32, 34, 38 and 40) thermocompression bonded to the rings 22 and 26 in FIGS. 1 and 4, and the metal closure ring 36 of FIG. 1, are all replaced by an α-alumina ceramic closure 66 (see also FIGS. 6 and 7). The closure 66 is broadly in the form of an annular panel having a central opening 68 and a filler opening 70.

The rims of the tubes 18 and 20 are glass welded into respective rebates 72 and 74 provided therefor in the lower surface of the panel 66. The cathode current collector tube 64 has an upward extension 76 butt welded to one side of the outside of the lower end portion of a tube 80 which also constitutes a filler pipe. In proximity to its upward extension 76, the current collector 64 is provided with a window or opening 78 to permit equalizing of granule level during filling of the cathode compartment. An α-alumina ceramic plug 82 is in turn glass welded into the filler opening 70.

The plug 82 has a pair of nickel connecting rings 84 and 86 thermocompression bonded thereto. The plug 82 has a flat axially upwardly facing surface to which a flange 85 of the ring 84 is bonded, the ring 84 having an upstanding rim. The plug 82 further has a flat axially downwardly facing surface to which a flange 87 of the ring 86 is bonded, the ring 86 also having an upstanding rim. The inner periphery of the flange 85 of the ring 84 is spaced with clearance from the ring 86. The filler tube 80 is of nickel and is welded into the rim of the ring 86, being closed off by a mild steel plug 88. The plug 82 has a tubular body 90, to the lower end of which the flange 87 of the ring 86 is bonded, and also has a flange 92 to which the flange 85 of the ring 84 is bonded. The opening 70 has a rebate at 94 into which the body 90 of the plug 82 fits, the flange 92 of the plug 82 being received in a shallow recess 95 (see FIG. 7) in the upper surface of the panel 66, concentrically surrounding the rebate 94 and opening 70. The flange 92 is glass-welded in position in the shallow recess 95.

In a development of this construction, the shallow recess 95 can be omitted, the lower face of the flange 92 of the plug resting on, and being glass-welded to the upper surface of the closure panel 66.

The upper end of the housing 14 is closed off by an annular mild steel closure in the form of a panel 96 having an upstanding outer rim welded into the rim of the open upper end of the housing 14. The panel 96 has a central opening with an upstanding rim into which an upstanding rim of a closure cap 98 is welded. The current collector rod 62 has a nickel sleeve 100 welded around its upper end, the sleeve 100 in turn being welded into a central hole in the cap 98. To one side of its central opening, the panel 96 has a further opening with an upstanding rim 102 into which the rim of the connecting ring 84 is welded. An insulating space is provided between the inner edge of the flange of the ring 84 and the upstanding rim of the connecting ring 86.

The panel 96, and the cap 98, sleeve 100, rod 62 and ring 84 hermetically close off the housing 14 with particular regard to the inner and outer anode compartments located respectively in the tube 20 and between the tube 18 and housing 14. It should be noted, however, that the anode compartments are in fluid flow communication and pressure communication with each other via the central opening 68 of the panel 66 and via a radial space between the outer periphery of the panel 66 and the inner curved surface of the housing 14.The active anode material in the inner anode compartment is electrically connected to that in the outer anode compartment by the rod 62 and housing 14, which are connected together by the panel 96, the cup 98 and the sleeve 100. The sleeve 100 forms an anode terminal for the cell, while the pipe 37 forms a cathode terminal for the cell.

Figure 8:
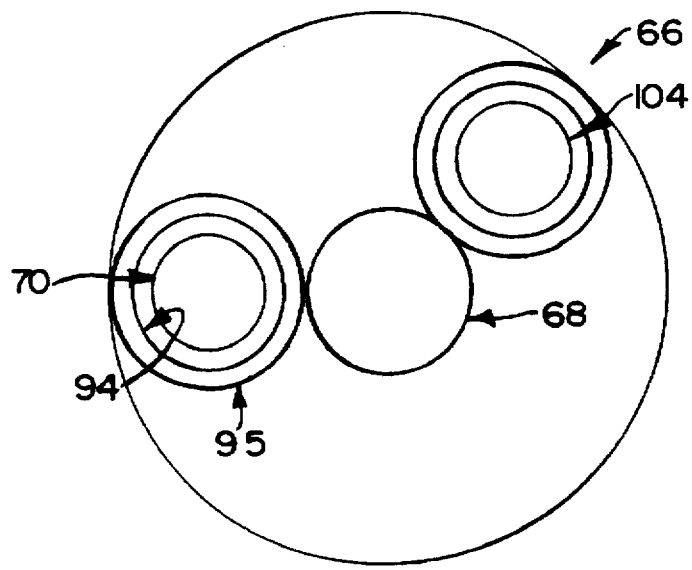
FIG. 8 shows a plan view of a variation of the closure of FIGS. 6 and 7.

In FIGS. 6, 7 and 8 the panel 66 of FIG. 5 is also designated by reference numeral 66, and the same reference numerals refer to the same parts as in FIG. 5. The panel 66 of FIGS. 6 and 7 is that shown in FIG. 5 and FIG. 8 shows a variation thereof with an additional opening 102, identical to the opening 70. In a cell of the type shown in FIG. 5 using a panel 66 of the type shown in FIG. 8, the filler tube 37 will not act as a cathode terminal, and will not be connected to the cathode current collector 64. Instead, a separate cathode terminal, which can be a rod (not shown) can be welded into a plug, similar to the plug 82 with its connecting rings 84 and 86, this plug being glass welded into the opening 102 and being welded via its connecting rings respectively to the cathode terminal rod and to the panel 96, the cathode terminal rod being welded to the upper rim of the ring 84, the connecting rings being electronically insulated from each other, in the fashion of the rings 84 and 86.

As indicated above, the outer anode part capacity will be greater than that of the inner anode part, and the total anode capacity will be matched with and roughly equal to that of the cathode. In a typical cell with a theoretical capacity of about 70 Ah, cell dimensions are expected to be as follows:

| | |
|---|---|
| Outer Diameter of Housing | about 51 mm |
| Wall Thickness of Housing | about 0,4 mm |
| Outer Diameter of Larger Separator Tube | about 45–46 mm |
| Outer Diameter of Smaller Separator Tube | about 23 mm |
| Cell Height | about 230 mm |
| Radial Spacing between Larger and Smaller Separator Tubes | about 10 mm. |

In particular, the separator tube spacing is a compromise which allows easy loading of the cathode compartment as described above, and which still provides acceptably high power with acceptably low concentration polarization in the cathode. In this regard it will be appreciated that, not only does the use of two anode parts promote high power, but it has the result that each anode part is electrochemically coupled with about half the cathode thickness (about 5 m), allowing rapid high power discharge while reducing said polarization.

Furthermore, importantly, it will be noted that the insulating ring 26 (FIG. 1) closes off a substantial part of the open upper end of the tube 18, between the tubes 18 and 20, thus reducing the area available for loading granules and molten electrolyte into the space between the tubes 18 and 20. If cathode thickness is made too thin, effectively rapid loading as described above of molten electrolyte and granules, in particular, into the tube 18 can become no longer commercially feasible.

Finally, it is to be noted that, by virtue of the wicking provided by the shims 52, 60 of molten sodium, the cell of FIG. 1 can be operated either vertically as shown, or horizontally, on its side.

We claim:

1. A high temperature rechargeable electrochemical cell comprising a cell housing divided by a pair of solid electrolyte separator tubes into two anode compartments each containing alkali metal active anode material, the alkali metal in each anode compartment being electronically connected to the alkali metal in the other anode compartment, and a cathode compartment sandwiched between the anode compartments, the cathode compartment containing cathode material, the cell having an operating temperature at which the alkali metal active anode material is molten, the housing and each separator tube being hollow and tubular in shape and being arranged so that the housing is outermost, a larger of the separator tubes nests within the housing and a smaller of the separator tubes nests within said larger separator tube, an inner of said anode compartments being defined by the interior of the smaller separator tube, the cathode compartment being defined between the separator tubes and an outer of said anode compartments being defined between the larger separator tube and the housing, the cell having an anode comprising the active anode material contained in both anode compartments and the cell having a cathode comprising the cathode material contained in the cathode compartment, the cell further comprising a cathode current collector which is a tube and nests within the larger separator tube with the smaller separator tube nesting within the cathode current collector tube, so that an inner part of the cathode is located between the smaller separator tube and the current collector tube and so that an outer part of the cathode is located between the cathode current collector tube and the larger separator tube, the cathode material comprising a porous electrolyte-permeable electronically conductive matrix and having a charged state in which it has a transition metal halide active cathode material dispersed in finely divided and/or thin layer solid form in the porous interior thereof the matrix being impregnated with an alkali metal aluminum halide molten salt electrolyte having an aluminium:alkali metal atomic ratio of at most 1:1 and being molten at the cell operating temperature: and the parts of the cathode compartment containing the inner and outer parts of the cathode being in fluid flow communication with each other.

2. A cell as claimed in claim 1, in which the shape and size of the cathode current collector tube, and its location between the separator tubes, are selected so that the active cathode material in the inner part of the cathode is electrochemically coupled substantially only with the alkali metal anode material contained in the smaller separator tube, the active cathode material in the outer part of the cathode being electrochemically coupled substantially only with alkali metal anode material located between the larger separator tube and the housing.

3. A cell as claimed in claim 1, in which the separator tubes and the cathode current collector tube are all of substantially the same length, being all circular in cross-section and are located concentrically within the housing.

4. A cell as claimed in claim 1, in which the cathode current collector tube has a tubular wall which is substantially impermeable to active cathode material.

5. A cell as claimed in claim 4, in which the wall of the cathode current collector tube is continuous and substantially impermeable to the molten salt electrolyte.

6. A cell as claimed in claim 1, in which the alkali metal anode material contained in the interior of the smaller separator tube and the inner part of the cathode together form a smaller sub-cell, the alkali metal anode material located between the larger separator tube and the housing and the outer part of the cathode together forming a larger sub-cell, the sub-cells being electronically connected in parallel with each other and having respective internal resistances which are in a ratio which remains substantially constant over all states of charge of the cell, from the fully charged state of the cell to the fully discharged state of the cell.

7. A cell as claimed in claim 1, in which the inner part of the cathode and the outer part of the cathode have respective capacities, and the smaller separator tube and the larger separator tube have respective surface areas, such that the inner cathode part capacity:outer cathode part capacity ratio is substantially the same as the smaller separator tube area:larger separator tube area ratio.

8. A cell as claimed in claim 1, in which the separator tubes each have an open end and a closed end, the open ends of the separator tubes being respectively glass welded to an electronically insulating ceramic closure whereby the cathode compartment is hermetically sealed.

9. A cell as claimed in claim 8, in which the housing is of metal, having an end adjacent the open ends of the separator tubes which is closed off by a metal closure which is welded in place, the housing acting as an anode current collector for the alkali metal anode material in the outer anode compartment, the inner anode compartment having an anode current collector projecting into alkali metal anode material in the inner anode compartment via the open end of the smaller separator tube from the metal closure, via which it is electronically connected to the housing, the cathode current collector tube having an extension projecting out of the metal closure, from which closure it is electronically insulated.

10. A cell as claimed in claim 1, in which the anode compartments are in communication with each other so that they are at the same pressure.

11. A cell as claimed in claim 1, in which the alkali metal active anode material is sodium, the alkali metal aluminium halide molten salt electrolyte being a sodium aluminium chloride molten sal electrolyte, the active cathode material being nickel chloride, and the separators being of a material selected from $\beta$-alumina and $\beta''$-alumina.

* * * * *

UNITED STATES PATENT AND TRADEMARK OFFICE
CERTIFICATE OF CORRECTION

PATENT NO.    :    5,716,731

DATED    :    February 10, 1998

INVENTOR(S)    :    Goetzer et al.

It is certified that error appears in the above-identified patent and that said Letters Patent is hereby corrected as shown below:

In claim 1, column 10, line 54, after 'thereof', insert --,--.

Signed and Sealed this

Fourteenth Day of April, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,716,731

DATED : February 10, 1998

INVENTOR(S) : Coetzer et al.

It is certified that error appears in the above-identified patent and that said Letters Patent is hereby corrected as shown below:

Title page, item [75], line 1, delete "Goetzer" and replace --Coetzer-- therefor.

Signed and Sealed this

Twenty-third Day of June, 1998

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,716,731
DATED : Feb. 10, 1998
INVENTOR(S) : Coetzer et al.

It is certified that error appears in the above-identified patent and that said Letters Patent is hereby corrected as shown below:

The title page should be deleted to appear as per attached title page.

Signed and Sealed this

Fifteenth Day of June, 1999

Attest:

Q. TODD DICKINSON

*Attesting Officer*     *Acting Commissioner of Patents and Trademarks*

United States Patent [19]

Coetzer et al.

[11] Patent Number: 5,716,731
[45] Date of Patent: Feb. 10, 1998

[54] ELECTROCHEMICAL CELL

[75] Inventors: Johan Coetzer; Pretoria; Roger J. Wedlake; Gordon Brodie, both of Johannesburg, all of South Africa; Røger J. Bones, Abingdon, England

[73] Assignee: Electro Chemical Holdings Societe Anonyme, Luxembourg, Luxembourg

[21] Appl. No.: 804,315

[22] Filed: Feb. 21, 1997

[30] Foreign Application Priority Data

Feb. 27, 1996 [GB] United Kingdom ............ 9604133

[51] Int. Cl.$^6$ ........................................ H01M 10/39
[52] U.S. Cl. .................................... 429/103; 429/104
[58] Field of Search .......................... 429/104, 103, 429/102, 193, 112

[56] References Cited

U.S. PATENT DOCUMENTS

| | | | |
|---|---|---|---|
| 1,368,093 | 2/1921 | Allen . | |
| 3,932,195 | 1/1976 | Evans et al. | 236/6 |
| 4,038,462 | 7/1977 | Rohr | 429/30 |
| 4,102,042 | 7/1978 | Weiner | 29/623.2 |
| 4,279,974 | 7/1981 | Nishio | 429/104 |
| 4,401,731 | 8/1983 | Steinleitner | 429/104 |
| 4,405,696 | 9/1983 | Fischer et al. | 429/104 |
| 4,424,262 | 1/1984 | von Alpen et al. | 429/8 |
| 4,473,624 | 9/1984 | Hug et al. | 429/104 |
| 4,564,568 | 1/1986 | Hasenauer et al. | 429/104 |
| 4,722,875 | 2/1988 | Wright | 429/103 |
| 4,774,156 | 9/1988 | Bones et al. | 429/103 |
| 4,913,754 | 4/1990 | Duncan et al. | 156/85 |
| 4,956,246 | 9/1990 | Kamuf et al. | 429/104 |
| 5,230,968 | 7/1993 | Bones et al. | 429/191 |
| 5,279,908 | 1/1994 | Bones et al. | 429/102 |
| 5,563,006 | 10/1996 | Von Benda et al. | 429/104 |

FOREIGN PATENT DOCUMENTS

| | | |
|---|---|---|
| 856697 | 11/1970 | Canada . |
| 1054674 | 5/1979 | Canada . |
| 2277444 | 1/1976 | France . |
| 2315778 | 1/1977 | France . |
| 2018013 | 10/1979 | United Kingdom . |
| 2226692 | 7/1990 | United Kingdom . |
| WO 89/04068 | 5/1989 | WIPO . |

OTHER PUBLICATIONS

Knoedler and Krapf, "Design and Performance of a Sodium/Sulphur Multitude Cell," *Journal of Power Sources*, 10:263–270, 1983, No month.

Johnson, Patent Specification Republic of South Africa 87/6885 "Battery," Sep. 14, 1987.

Patent Specification UK 1,421,702 "Electrochemical Cells," Jan. 21, 1976.

Patent Specification UK 1,461,071 "Improvements in or Relating to Electrochemical Cells Having a Liquid Alkali Metal Electrode," Jan. 13, 1977.

Patent Specification UK 1,508,803 "Improvements in or Relating to Electric Batteries," Apr. 26, 1978.

Patent Specification UK 1,505,987 "Improvements in or Relating to Electric Cells," Apr. 5, 1978.

*Primary Examiner*—Anthony Skapars
*Attorney, Agent, or Firm*—Arnold, White & Durkee

[57] ABSTRACT

A high temperature rechargeable electrochemical cell is provided, comprising a housing divided by a pair of concentric separator tubes into two anode compartments each containing molten alkali metal active anode material, the alkali metal in each anode compartment being electronically connected to the alkali metal in the other anode compartment, and a cathode compartment sandwiched between the anode compartments. The cathode compartment contains cathode material comprising a porous electrolyte-permeable electronically conductive matrix with a charged state in which it has a transition metal halide active cathode material dispersed therein, the matrix being impregnated with molten salt electrolyte. The cell comprises a cathode current collector tube located between the separator tubes, so that an inner part of the cathode is located between the smaller separator tube and the current collector tube, an outer part of the cathode being located between the current collector tube and the larger separator tube.

11 Claims, 5 Drawing Sheets

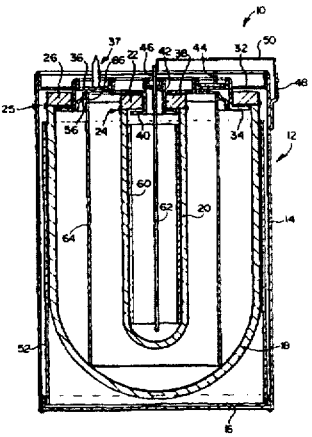

UNITED STATES PATENT AND TRADEMARK OFFICE
CERTIFICATE OF CORRECTION

PATENT NO. : 5,716,731
DATED : February 10, 1998
INVENTOR(S) : Johan Coetzer et al.

It is certified that error appears in the above-identified patent and that said Letters Patent is hereby corrected as shown below:

In claim 1, column 10, line 57, after 'temperature' delete : and insert --;--.

Signed and Sealed this

Fourteenth Day of September, 1999

Attest:

Q. TODD DICKINSON

*Attesting Officer*   *Acting Commissioner of Patents and Trademarks*